J. H. DOWNIE.
IMPRESSION CAKE.
APPLICATION FILED NOV. 12, 1918.

1,303,545.

Patented May 13, 1919.

J.H.Downie, Inventor

Witness

By C.A.Snow & Co.
Attorneys

UNITED STATES PATENT OFFICE.

JAMES H. DOWNIE, OF SAN ANTONIO, TEXAS.

IMPRESSION-CAKE.

1,303,545.  Specification of Letters Patent.  Patented May 13, 1919.

Application filed November 12, 1918. Serial No. 262,210.

*To all whom it may concern:*

Be it known that I, JAMES H. DOWNIE, a citizen of the United States, residing at San Antonio, in the county of Bexar and State of Texas, have invented a new and useful Impression-Cake, of which the following is a specification.

This invention relates to cakes of dental impression material, and to a method of making the same.

It is well known to those skilled in the art that all impression compounds, as they get old, harden on their outer surfaces, due to oxidation, and these hardened portions will not soften as readily as the interior portions of the cakes of material and, as a result, it is difficult to obtain a good impression.

One of the objects of the present invention is to provide a cake of impression material which can be split readily to expose two unoxidized surfaces, the cake being produced in a novel manner.

With the foregoing and other objects in view which will appear as the description proceeds, the invention consists of certain novel details of construction and combinations of parts which will be hereinafter more fully described and pointed out in the claims it being understood that various changes may be made in the construction of the device and the method of making it, without departing from the spirit or sacrificing any of the advantages of the invention as set forth in the appended claims.

In the accompanying drawings the preferred form of the invention and the steps of the method of making the cake, have been shown.

In said drawings—

Figure 1:
Figure 1 is a perspective view of a strip of impression material produced by the first step of the method of manufacture.
Figure 2:
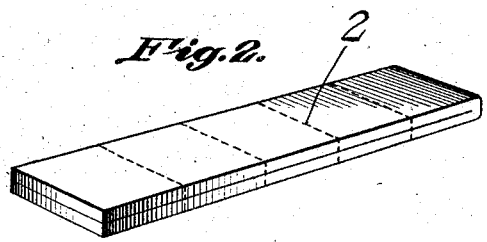
Fig. 2 is a view showing the product of the second step.
Figure 3:
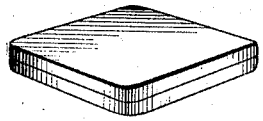
Fig. 3 is a perspective view of the finished cake.

Referring to the figures by characters of reference, 1 designates a flat strip of impression material produced by rolling the material, said strip being of the same width as a finished cake but of any desired length. The strip 1 is folded to form a strip of double thickness as shown in Fig. 2 and after being heated slightly, the folded strip is subjected to pressure with the result that the two inner faces thereof will cohere slightly to each other. The doubled or folded strip is then cut along the lines 2 so as to form cakes, one of which has been shown in Fig. 3 and the two layers of the cake will cohere to each other under all ordinary conditions, excluding air from between them and thus preventing oxidation of said surfaces. When it is desired to use the cake a knife blade may be forced into the sides of the cake and will separate the two thicknesses, thus exposing the fresh unoxidized surfaces which can be used for obtaining an excellent dental impression.

What is claimed is:—

1. A cake of dental impression material consisting of two layers of said material the inner faces of which are in intimate contact.

2. A cake consisting of contacting layers of dental impression material, said layers being of the same kind of material and held together by cohesion.

3. The method of making a dental impression cake which consists in forming a strip of impression material, folding the strip to form layers, slightly heating the material and pressing the layers together, and cutting the folded strip into cakes.

In testimony that I claim the foregoing as my own, I have hereto affixed my signature in the presence of two witnesses.

JAMES H. DOWNIE.

Witnesses:
S. S. CHARLES,
A. H. MUIR.

Copies of this patent may be obtained for five cents each, by addressing the "Commissioner of Patents, Washington, D. C."